US009143775B2

(12) United States Patent
Wyckens et al.

(10) Patent No.: US 9,143,775 B2
(45) Date of Patent: Sep. 22, 2015

(54) METHOD OF EVALUATING AT LEAST ONE DEFECT OF QUALITY IN A DATA SIGNAL, ASSOCIATED DEVICE AND COMPUTER PROGRAM

(71) Applicant: Orange, Paris (FR)

(72) Inventors: Emmanuel Wyckens, St. Medard sur Ille (FR); Catherine Colomes, Domloup (FR); Ulrich Lehy, Chartres de Bretagne (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/356,787

(22) PCT Filed: Oct. 30, 2012

(86) PCT No.: PCT/FR2012/052512
§ 371 (c)(1),
(2) Date: May 7, 2014

(87) PCT Pub. No.: WO2013/068676
PCT Pub. Date: May 16, 2013

(65) Prior Publication Data
US 2014/0293067 A1    Oct. 2, 2014

(30) Foreign Application Priority Data

Nov. 7, 2011    (FR) ...................................... 11 60118

(51) Int. Cl.
*H04N 17/02*    (2006.01)
*H04N 17/00*    (2006.01)
*H04N 17/04*    (2006.01)

(52) U.S. Cl.
CPC ............. *H04N 17/004* (2013.01); *H04N 17/04* (2013.01)
USPC ........................................................ 348/180

(58) Field of Classification Search
CPC .................................................... H04N 17/02
USPC .......... 348/180, 192, 193, 189; 382/107, 272, 382/199, 254, 286, 274, 228
See application file for complete search history.

(56) References Cited

U.S. PATENT DOCUMENTS 6,173,422 B1 *   1/2001   Kimura et al. ................... 714/57
6,285,797 B1 *   9/2001   Lubin et al. ..................... 382/254
(Continued)

FOREIGN PATENT DOCUMENTS

EP    1244312 A1    9/2002
EP    1804519 A1    7/2007
(Continued)

OTHER PUBLICATIONS

International Search Report and Written Opinion dated Jan. 17, 2013 for corresponding International Application No. PCT/FR2012/052512, filed Oct. 30, 2012.
(Continued)

*Primary Examiner* — Paulos M Natnael
(74) *Attorney, Agent, or Firm* — David D. Brush; Westman, Champlin & Koehler, P.A.

(57) ABSTRACT

Method of evaluating a defect of quality in a data signal, associated device and computer program. The method evaluates the defect of a carrier signal bearing data intended to be restored to a recipient, the signal including a video component and audio component. The method includes the following steps implemented on at least one sample of the signal: detection of a defect in the video component of the sample and calculation of a duration associated with the defect; assigning a class of defect to the defect detected as a function of its associated duration; according to the class of defect assigned, obtaining a result of searching for a defect in the audio component at the instants corresponding to the sample; deciding to confirm the detection of a defect of quality in the sequence as a function of the result of the search for a defect in the audio component.

12 Claims, 7 Drawing Sheets

(56) References Cited

U.S. PATENT DOCUMENTS

Figure 1:
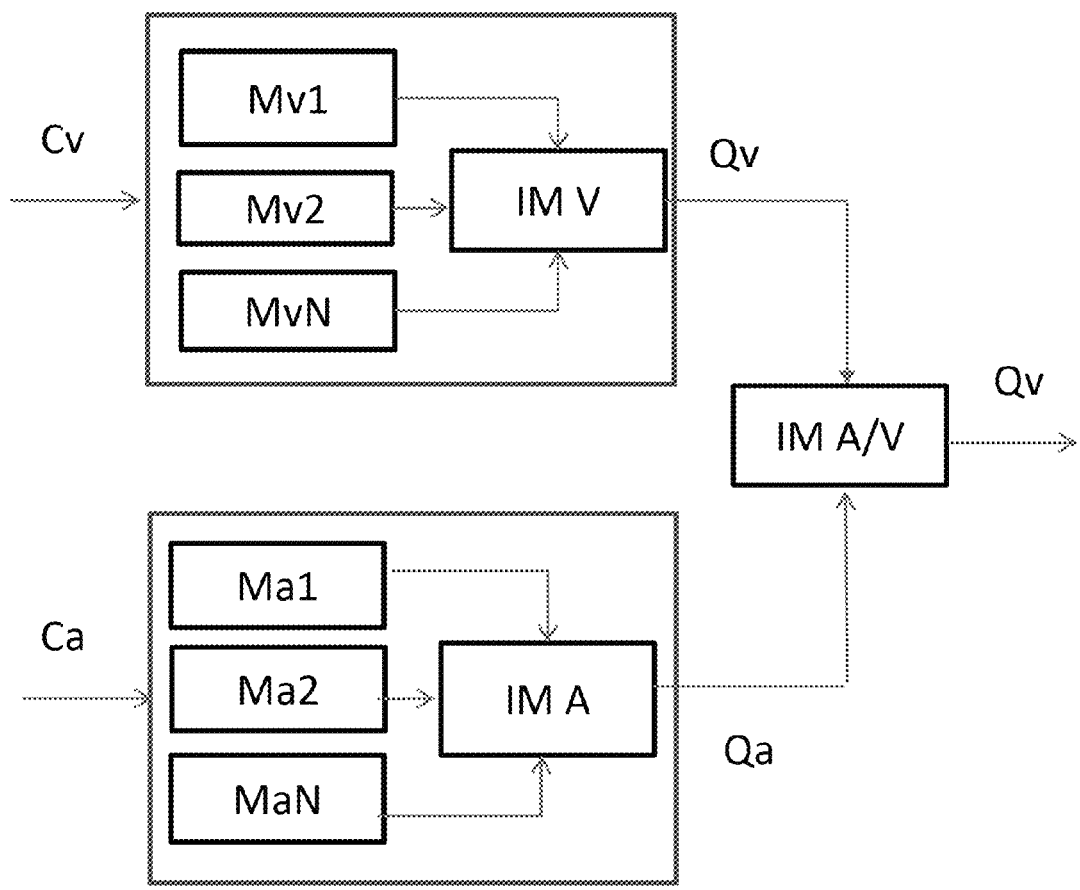

| | | | |
|---|---|---|---|
| 6,377,297 B1 * | 4/2002 | Janko et al. | 348/180 |
| 6,377,299 B1 * | 4/2002 | Hamada | 348/192 |
| 6,400,400 B1 * | 6/2002 | Isnardi et al. | 348/180 |
| 6,493,023 B1 * | 12/2002 | Watson | 348/180 |
| 6,633,329 B2 * | 10/2003 | Janko et al. | 348/180 |
| 6,734,898 B2 * | 5/2004 | Zeidler | 348/183 |
| 6,795,580 B1 * | 9/2004 | Janko et al. | 382/199 |
| 6,798,919 B2 * | 9/2004 | Ali et al. | 382/272 |
| 6,906,743 B1 * | 6/2005 | Maurer | 348/180 |
| 7,002,637 B2 * | 2/2006 | Szybiak et al. | 348/700 |
| 7,015,947 B1 * | 3/2006 | Hollier | 348/180 |
| 7,023,926 B2 * | 4/2006 | Matsuura et al. | 375/240.27 |
| 7,038,710 B2 * | 5/2006 | Caviedes | 348/180 |
| 7,483,550 B2 * | 1/2009 | Oka et al. | 382/107 |
| 7,683,931 B2 * | 3/2010 | Pirzada et al. | 348/192 |
| 7,738,393 B2 | 6/2010 | Pastrana et al. | |
| 7,796,157 B2 * | 9/2010 | Sheldon et al. | 348/192 |
| 7,876,355 B2 * | 1/2011 | Stevens | 348/180 |
| 8,531,531 B2 * | 9/2013 | Raake et al. | 348/192 |
| 8,564,669 B2 * | 10/2013 | Seigneurbieux | 348/180 |
| 8,581,987 B1 * | 11/2013 | Chu et al. | 348/193 |
| 2008/0298470 A1 * | 12/2008 | Boyce et al. | 375/240.27 |
| 2012/0307076 A1 * | 12/2012 | Hall et al. | 348/180 |

FOREIGN PATENT DOCUMENTS

| | | |
|---|---|---|
| EP | 2112835 A1 | 10/2009 |
| WO | 2006103327 A1 | 10/2006 |

OTHER PUBLICATIONS

Pastrana-Vidal et al., "Metrique Perceptuelle de Repture de Fluidite Video Sans Reference", Conference Coresa, XX, XX, May 26, 2004, XP002354701.

International Preliminary Report on Patentability and English Translation of the Written Opinion dated May 13, 2014 for corresponding International Patent Application No. PCT/FR2012/052512, filed Oct. 30, 2012.

Pastrana-Vidal et al., "No Reference Perceptual Metric of Breaks on Video Fluidity", Conference CORESA, May 26, 2004.

* cited by examiner

METHOD OF EVALUATING AT LEAST ONE DEFECT OF QUALITY IN A DATA SIGNAL, ASSOCIATED DEVICE AND COMPUTER PROGRAM

1. CROSS-REFERENCE TO RELATED APPLICATIONS

This application is a Section 371 National Stage Application of International Application No. PCT/FR2012/052512, filed Oct. 30, 2012, which is incorporated by reference in its entirety and published as WO 2013/068676 on May 16, 2013, not in English.

2. FIELD OF THE INVENTION

The field of the invention is that of the evaluation of quality of audiovisual data signals comprising at least one video component and one audio component.

The invention applies in particular to audiovisual data signals which have undergone degradations during their transmission on telecommunications networks or during transcoding operations.

3. BACKGROUND

Today, audiovisual contents are transmitted via video on-demand services, video catch-up, live etc. These services possess well-defined production and broadcasting chains with which errors may appear and accumulate on the various links of these two chains.

Depending on the systems for capture, contribution, encoding, transmission, reception, and the audiovisual terminals employed, the errors may be manifested through the appearance of artifacts in the audio and video components. The appearance of these degradations may occur simultaneously in both these components.

Defects of the video component often arise through image jerk or freeze. Defects in the audio component are manifested for their part as a sound loss. The duration of these two degradations fluctuates from a few milliseconds to a few hours. The frequency of appearance of this type of event can also vary over time. The defects can equally well be of low occurrence as sustained according to a time scale.

These degradations are a source of discomfort to end users, which sometimes leads them to reject the service, if the annoyance caused becomes too significant.

Currently, the appliances deployed which ensure automatic control of audiovisual quality perform measurements on the audio and video components of signals output by the terminal or samples at the level of the decoder without taking account of the reference signal, since these latter are rendered inaccessible technically or by law. They use models classed as "reference-free" and produce scores which fluctuate over a quality scale. The conclusions of appraisals of "reference-free" prediction devices have shown that performance must be greatly improved with respect to human sentiment.

A method for evaluating a degradation in quality of an audiovisual signal based on a model for predicting the impact of the discontinuity of the fluidity of the images on subjective quality is known from document WO2006/103327. A basic scheme of the evaluation method in question is presented in conjunction with FIG. 1. Measurements of discontinuity are conducted in parallel on the video and audio components of the signal to be evaluated. Various audio and video metrics are employed to rate various types of defect (for example image freezes, the presence of blurring or else of blockiness in the images for the video component, sound losses for the audio component). A video decision module takes into account the results of the evaluations carried out with the aid of the various metrics and allots an overall quality score to the video component, with the aid of a video interaction model. An audio decision module does likewise for the audio component and allots an overall quality score to the audio component on the basis of an audio interaction model. An audio/video weighting module takes into account both the video overall quality score and the audio overall quality score so as to assign an overall quality score to the audiovisual signal. This entails a so-called cognitive approach since the model reproduces the mechanism of human judgment through the production of scores on a quality scale.

The prior art calculates the degradation in the perceived quality caused by each break in fluidity, and sound cutoff. The calculations are performed in a disjoint manner on the audio and video components and without a priori or a posteriori interaction of the results obtained. This approach fails when faced with artificially created discontinuities and when they are not considered to be perceivable by human judgment. In these typical cases, interpretation errors appear and generate false alarms.

4. SUMMARY OF THE INVENTION

The invention improves the situation with the aid of a method for evaluating at least one defect of quality of a signal carrying data intended to be played back to a recipient, said signal comprising at least one video component and one audio component.

Such a method comprises the following steps, implemented on at least one sample of said signal:

detection of at least one defect in the video component of the sample and calculation of a duration associated with said at least one defect;

assignment of a defect class to said at least one defect detected at least as a function of its associated duration;

depending on the assigned defect class, obtaining of a result of a search for at least one defect in the audio component at the instants corresponding to the sample;

decision to confirm the detection of a defect of quality in the sequence at least as a function of the result of the search for a defect in the audio component.

With the invention, when a defect is detected in the video component, a defect class is assigned to it. Depending on the defect class assigned, the method according to the invention does or does not obtain the results of a search for defects in the audio component, with a view to confirming or denying the defect detected in the video component.

Thus, the method according to the invention makes it possible to improve the evaluation of the quality of a degraded video signal by having recourse to a defect detection on the audio component, thereby allowing it to remove an indeterminacy in the detection of video degradation.

Rather than taking a decision for the video component and a decision for the audio component in parallel as is the case in the prior art, the method according to the invention therefore enriches the model for evaluating video quality directly with the aid of the detection results in respect of the degradations in the audio component.

The invention therefore proposes an entirely new and inventive approach to the evaluation of the degradations undergone by a signal, which relies on the enrichment of the video model used to evaluate the video component of this signal with the aid of the results of the evaluation of the audio component.

According to one aspect of the invention, the detection step comprises, subsequent to the detection of a defect in the video component, a sub-step of rejecting the detected defect if its associated duration is less than a first predetermined perceptual detection threshold.

Thus, only the defects of sufficient duration to be potentially perceivable by the user are retained for the following steps of the method.

According to another aspect of the invention, the decision step comprises a sub-step of aggregating the durations associated with the image defects detected of like class, a sub-step of rejecting said defects of like class, if their aggregated duration is less than a second predetermined perceptual detection threshold.

In this manner, only the image defects of a particular class which are actually perceived by the user are kept for the evaluation of the quality of the audiovisual signal.

According to another aspect of the invention, the detection step is intended to detect defects of image freeze type, in that it comprises a step of calculating a value of similarity between images of the sample and a step of comparing the calculated similarity value with a predetermined threshold.

Among the defects liable to be detected on a video component are defects of image freeze type. According to this embodiment of the invention, the detection of defects in the video component relates to defects of image freeze type. An image freeze is detected when several images of the sequence are sufficiently similar to one another.

According to another aspect, the class of image freeze detected belongs to a group comprising at least:
 a micro freeze;
 a conventional freeze;
 a postproduction effect;
 a macro freeze.

To a detected image freeze is assigned a freeze class from among a set of classes of predetermined defects of freeze type.

According to another aspect of the invention, the step of obtaining a result of a search for a defect in the audio component is implemented for a defect of image freeze type whose class belongs to the group comprising at least:
 micro freeze;
 conventional freeze:
 postproduction effect.

For the classes of image defects listed, there exists an indeterminacy in the result of the detection which justifies recourse to the analysis of the audio component.

According to another aspect of the invention, the step of obtaining a result of a search for a defect in the audio component is not implemented for a defect of image freeze type whose class belongs to the group comprising at least:
 macro freeze.

For this image freeze class, the result of the detection on the video component is considered to be sufficiently reliable so that it is not necessary to have recourse to the search for degradations in the audio component.

According to another aspect of the invention, the detection step is intended to detect defects of blockiness effect type, and it comprises a step of calculating a value of degree of blockiness per image of the sample and a step of comparing the calculated value with a predetermined threshold.

Block effects constitute another type of defect which are liable to be detected in a video component. According to this embodiment of the invention, a defect of blockiness effect type (also known as "blockiness") is detected when several images of the sequence have a sufficiently high degree of blockiness.

The invention also relates to a device for evaluating a defect of quality of a signal, able to implement the method which has just been described.

Such a device can be integrated into a receiver of audiovisual signals or into any other node appliance of a telecommunications network, such as an audiovisual contribution or transcoding system. The invention therefore relates furthermore to a receiver of a video signal transmitted in a telecommunications network, said signal comprising at least one video component and one audio component. According to the invention, such a receiver comprises a device for evaluating defects of quality according to the invention.

It also relates to a node appliance of a telecommunications network comprising a device for evaluating quality according to the invention.

The invention also relates to a system for distributing an audiovisual signal to at least one user terminal, said system comprising a plurality of node appliances connected to at least one telecommunications network, a node appliance being able to receive said signal and to retransmit it to a neighboring node appliance. According to the invention, at least one appliance from among the group comprising the plurality of node appliances and the receiver appliance comprises the device for evaluating a defect of quality which has just been presented.

The invention further relates to a computer program comprising instructions for the implementation of a method of evaluating quality of an audiovisual signal such as described above, when this program is executed by a processor. Such a program can use any programming language. It can be downloaded from a communication network and/or recorded on a medium readable by computer.

Finally, the invention pertains to a storage medium, readable by a processor, storing a computer program implementing the method for evaluating at least one defect of quality which has just been described.

5. LIST OF FIGURES

Figure 2:
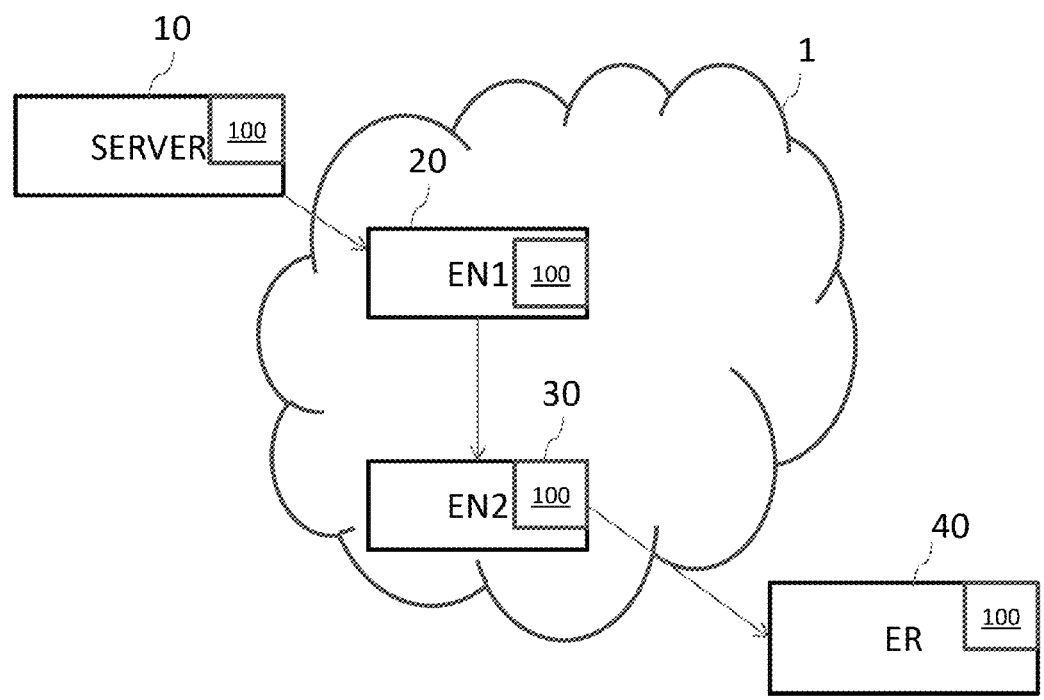
Figure 3:
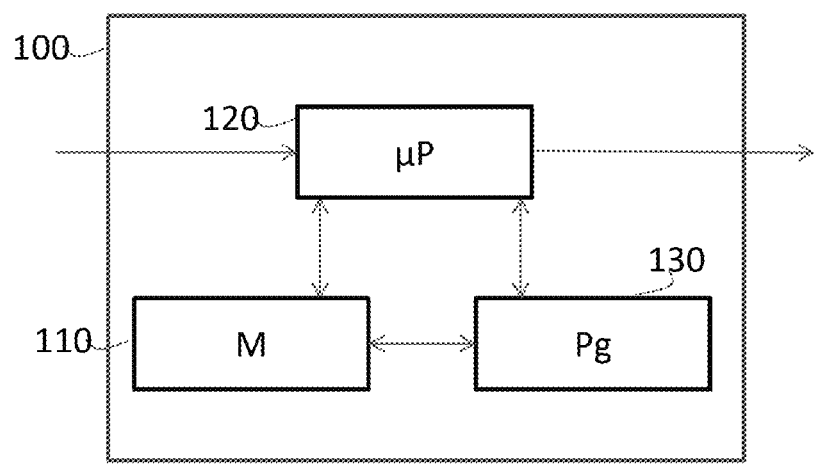
Figure 4:
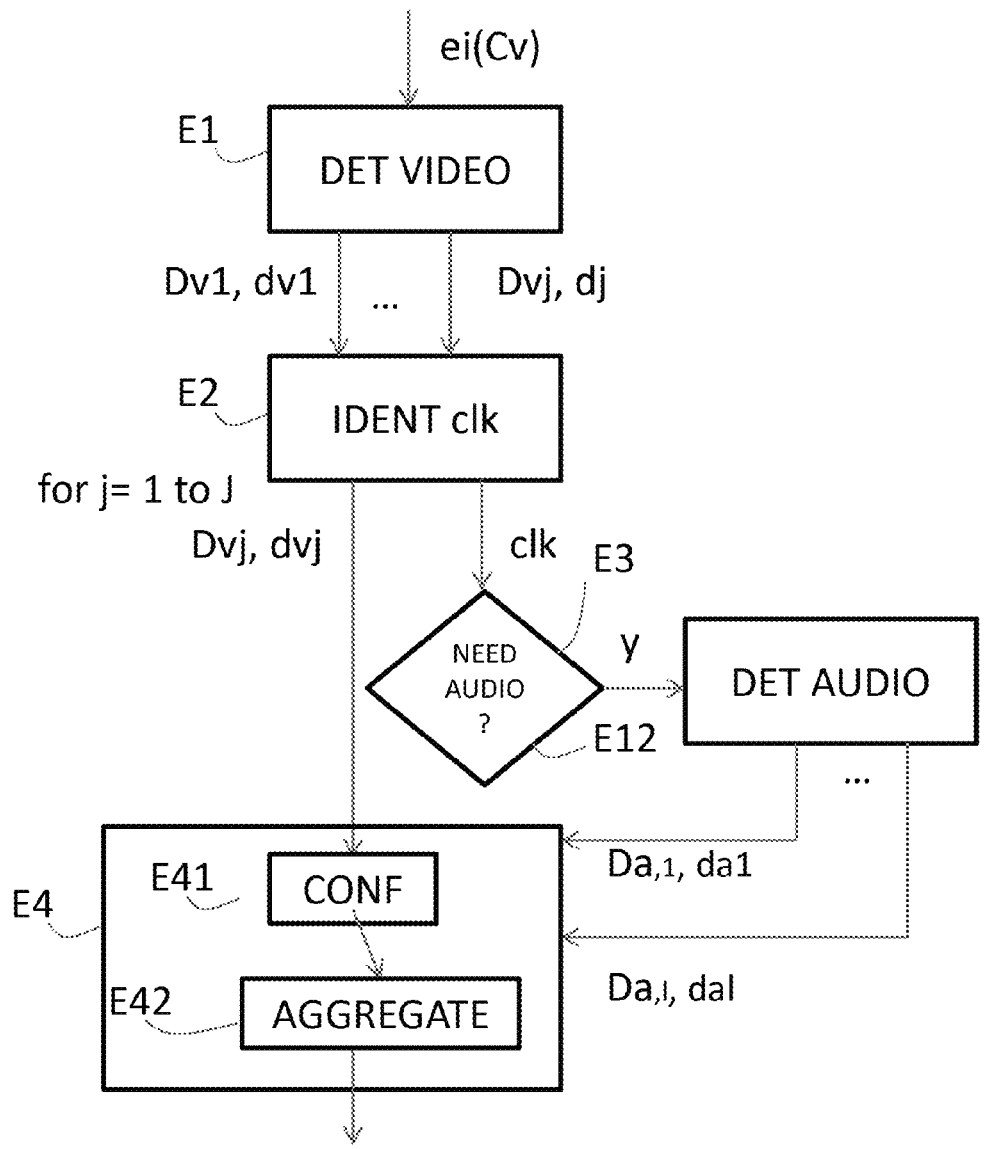
Figure 5:
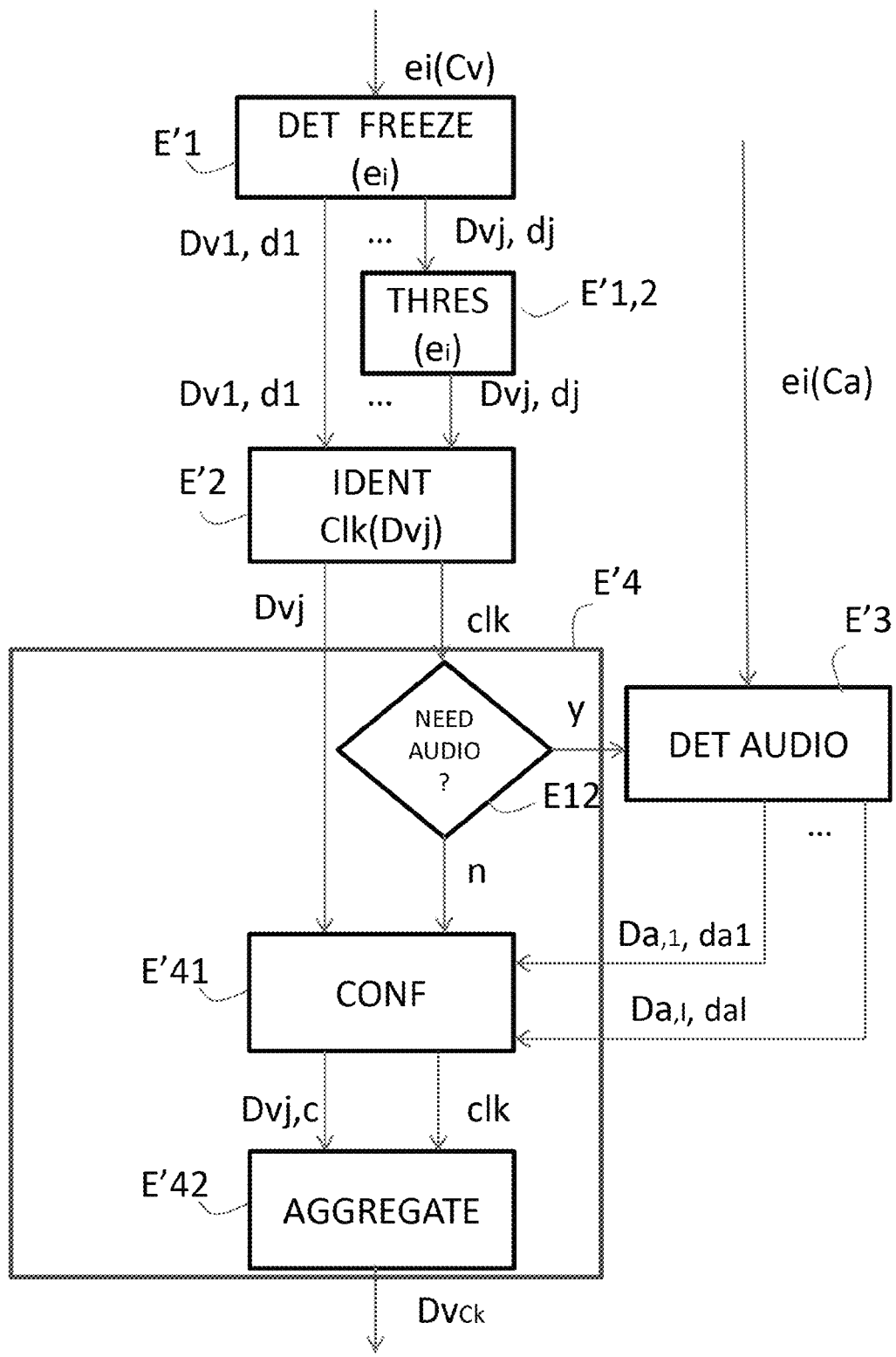
Figure 6:
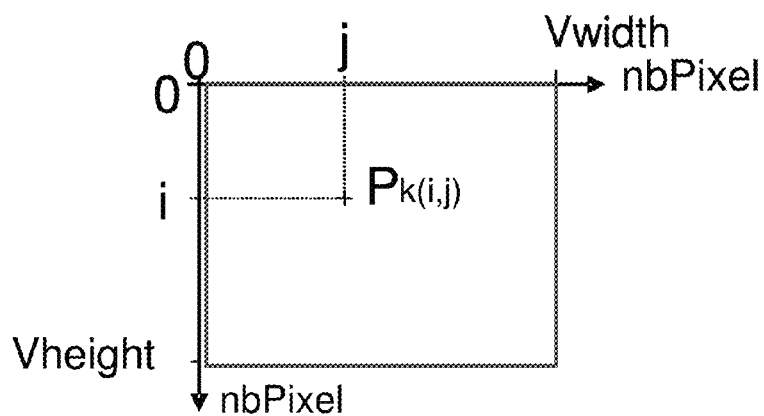
Figure 7:
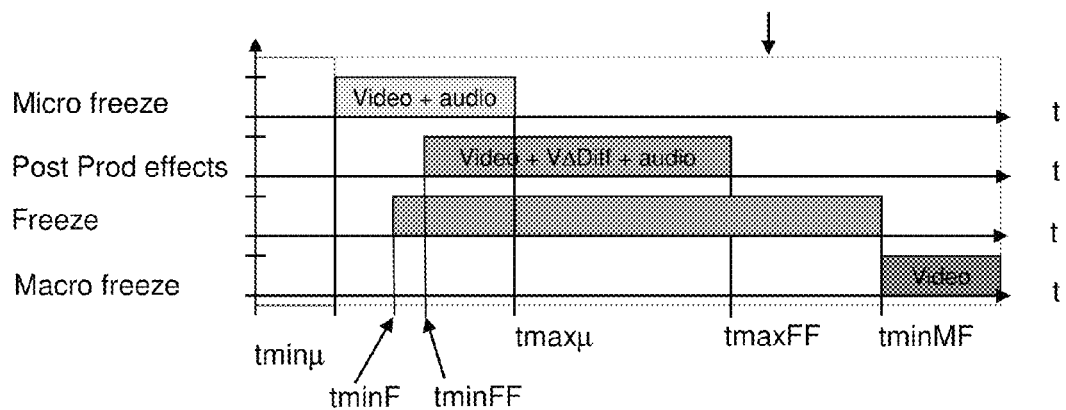
Figure 8:
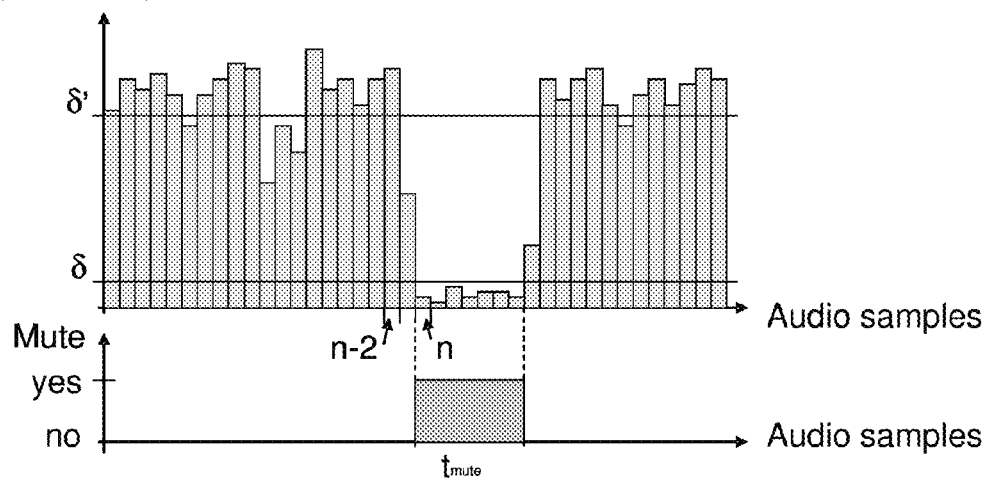
Figure 9:
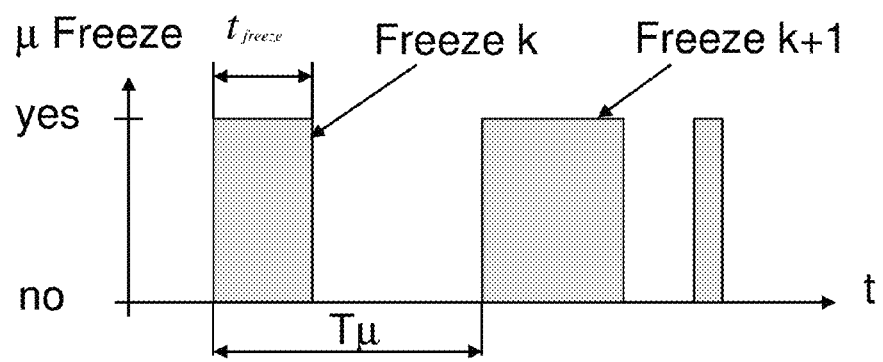
Figure 10:
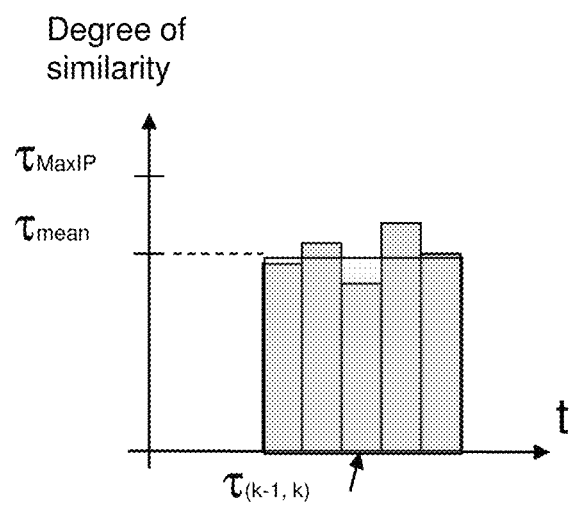

Other advantages and characteristics of the invention will become more clearly apparent on reading the following description of a particular embodiment of the invention, given by way of simple illustrative and nonlimiting example, and of the appended drawings, among which:

FIG. 1 illustrates the scheme for evaluating a degradation in quality of an audiovisual signal according to the prior art;

FIG. 2 presents in a schematic manner an exemplary system for distributing an audiovisual signal according to the invention;

FIG. 3 presents in a schematic manner the structure of a device for evaluating defects of quality of an audiovisual signal according to the invention;

FIG. 4 presents in a schematic manner the method for evaluating a defect of quality of an audiovisual signal according to the invention;

FIG. 5 presents in a schematic manner the steps of the method for evaluating defects of quality of an audiovisual signal according to an embodiment of the invention, according to which defects of image freeze type are evaluated;

FIG. 6 presents in a schematic manner a graphical representation of an image of the video component of an audiovisual signal to be evaluated;

FIG. 7 illustrates in a schematic manner an example of sound loss in an audio component of an audiovisual stream;

FIG. 8 presents in a schematic manner classes of defects of image freeze type taken into account in an embodiment of the invention;

FIG. 9 presents in a schematic manner the profile of a defect of micro freeze type; and FIG. 10 presents in a schematic manner a curve of variation of a measurement of degree of similarity for an image freeze belonging to the class of postproduction effects.

6. DESCRIPTION OF A PARTICULAR EMBODIMENT OF THE INVENTION

The general principle of the invention relies on recourse to the result of the analysis of the audio signal in the case of indeterminacy in the detection of at least one image defect in the audio component.

6.1 System for Distributing an Audiovisual Signal

In the subsequent description, an audiovisual signal S is considered, comprising at least one video component Cv and at least one audio component Ca. Such a signal S can be intercepted at any juncture of an audiovisual transmission chain, between an emitter appliance, a node appliance of the telecommunications network or a client receiver appliance.

In conjunction with FIG. 2, a system for distributing an audiovisual signal S according to the invention is considered. Such a system comprises a server Sery for distributing the audiovisual S. Such a server may be for example a video on-demand server or a server for broadcasting audiovisual contents live. The signal S is transmitted via a telecommunications network 1, which comprises a plurality of node appliances EN1, EN2. The node appliances EN1, EN2 are able to receive the signal S from a neighboring node and to retransmit it to another node of the network 1. The signal S is ultimately received by at least one recipient appliance, for example the receiver appliance ER, which may be a client terminal of the mobile terminal type or TV decoder for example.

The invention can be implemented in any of these appliances Serv, EN1, EN2, ER which form the distribution chain for the audiovisual signal S.

6.2 Exemplary Structure of a Device for Evaluating Defects of Quality

The simplified structure of a device 100 for evaluating quality of an audiovisual signal implementing the invention is presented in conjunction with FIG. 3.

For example, the device comprises a memory 110 comprising a buffer memory M, a processing unit 120, equipped for example with a processor P, and driven by a computer program Pg 130, implementing the method of evaluating quality according to the invention.

Upon initialization, the code instructions of the computer program 130 are for example loaded into a RAM memory before being executed by the processor of the processing unit 120. The processing unit 120 receives as input at least one sample of an audiovisual signal to be evaluated. The processor of the processing unit 120 implements the steps of the above-described method of evaluating quality, according to the instructions of the computer program 130. Accordingly, the device comprises, in addition to the memory 110, means for obtaining a detection of at least one defect of quality in the video component of the sample, means for assigning a defect class to said at least one defect detected at least as a function of its associated duration, means for obtaining a result of a search for at least one defect in the audio component at the instants corresponding to the sample according to the assigned defect class and decision means to confirm the detection of a defect of quality in the sequence at least as a function of the result of the search for a defect in the audio component. These means are driven by the processor of the processing unit 120.

Advantageously, such a device 100 can be integrated into at least one of the appliances Serv, EN1, EN2 and ER of the system for distributing an audiovisual signal according to the invention.

6.3 Method for Evaluating a Defect of Quality According to the Invention

The steps of the method for evaluating a defect of quality undergone by the audiovisual signal S according to the invention are presented in conjunction with FIG. 4. Such a method is advantageously implemented by the device 100 which has just been described.

A signal S is considered, cut up into I samples $e_i$, with I a non-zero integer, each of a parametrizable duration $T_{smp}$, whose value is generally from 5 to 10 ms.

The method according to the invention is applied to such a sample e, of the signal.

A sample ei of the video component Cv comprises NbI images, with NbI a non-zero integer.

In the course of a step $E_1$, at least one image defect $Dv_j$ is detected in a sample $e_i$ of the video component Cv of the signal S. Hereinafter, we consider J defects Dv1 to DvJ detected in the sample ei, with J a non-zero integer. Obviously, if no defect is detected, it is not necessary to implement the method according to the invention.

In an advantageous manner, the aforementioned detection is obtained by analysis of the video component on the sample $e_i$. An exemplary analysis procedure will be detailed subsequently.

In the course of this step $E_1$, a duration $d_j$ of the defect Dvj is calculated, for each defect Dvj detected, and is associated therewith.

The defect Dvj detected is thereafter identified in the course of a step $E_2$, at least as a function of the duration $d_j$ calculated. This entails assigning it an image defect class from among several predetermined defect classes Cl1 to ClK, with K a non-zero integer.

According to the identified class of image defect, a step $E_3$ of obtaining a result of analyzing the audio component Ca on a sample eai corresponding to the sample evi, is or is not triggered. It will be understood that for certain classes of image defect, the analysis of the video component alone is indeed not considered sufficient by itself to allow reliable identification of the detected defect.

The analysis of the audio component, which has been, for example, conducted in parallel with that of the video component, may lead to the detection of possible defects of audio type Da1 to DaL, with L a non-zero integer, in the audio component Ca of the signal S. An exemplary procedure for analyzing the audio component will be presented subsequently.

The audio analysis result $Da_i$ obtained is now considered. Be it positive (at least one defect Dal of audio freeze type detected) or negative (no defect of image freeze type detected in the audio sample $ea_i$), it is taken into consideration, during a decision step E4. In the course of this decision step, we consider at least the image defects Dvj belonging to classes Clk, k an integer lying between 1 and K, for which recourse to the result of the analysis of the audio component is judged necessary. These defects are submitted to a confirmation substep $E_{4,1}$, intended to confirm or to deny the defect Dvj as a defect to be taken into consideration in respect of the signal quality perceived by the user. According to the class Clk considered, this entails either verifying that an audio defect has been detected at the same instants as the current defect Dvj, or on the contrary, verifying that there is no audio defect corresponding to the defect Dvj to be confirmed. As a function of the result of this verification, the defect in question is therefore kept or rejected.

According to one embodiment of the invention, the decision step $E_4$ comprises a sub-step $E_{4,2}$ of aggregating the durations associated with image defects of like class and of comparisons of the aggregated duration obtained with a threshold. Only the defects of sufficient aggregated duration are retained and participate in the evaluation of the signal quality perceived by the user.

6.4 Evaluation of the Defects of Image Freeze Type

The implementation of the method according to the invention for the detection of defects of image freeze type is now considered, by way of illustrative and nonlimiting example, in conjunction with FIG. 5. The video component Cv of an audiovisual signal S is cut up into samples evi, i an integer ranging from 0 to I, each of duration of for example between 5 and 10 ms. The method according to the invention is implemented for at least one sample evi. In an advantageous manner, it is repeated for each sample of the video component Cv.

In the course of a step $E'_1$, defects of image freeze type are detected in a sample evi.

A procedure for detecting defects of image freeze type in a sample evi of a video component Cv of an audiovisual signal S will now be presented.

6.4.1 Video Detection

We consider a sample $ev_i$ of a video component Cv, represented in an arbitrary colorimetric space, of an audiovisual signal S. Hereinafter, we shall limit ourselves to a colorimetric representation in terms of luminance and chrominance containing NbI images, with NbI a strictly positive integer, and the size of whose image is Vheight*Vwidth. Vheight and Vwidth are strictly positive integers.

In conjunction with FIG. 6, Pk(i,j) denotes the pixel of the $k^{th}$ image, in row i and in column j, and Pprec(i, j) denotes the pixel of a previous image of the $k^{th}$ image of the video under analysis.

K∈ [1, NbI−1], i∈ [0, Vheight] and j∈ [0, Vwidth].

A defect of image freeze type is characterized by a break in fluidity between the image k and the neighboring image $P_{prec}$ of the video sequence.

A break in fluidity is evaluated by calculating the derivative of luminance and chrominance in the following manner:

The Y, U and V components respectively of Pk(i,j) and Pprec(i, j) are denoted Yk(i,j), Uk(i,j), Vk(i,j) and Yprec(i, j), Uprec(i,j) and Vprec(i, j).

Y represents the luminance of the pixel, U the blue difference component and V the red difference component of the pixel.

Let ΔP(k, ref)(i,j) be the function such that ref∈ [0, NbI−2], ∀k∈ [1, NbI−1], ∀ i∈ [0, Vheight] and ∀j∈ [0, Vwidth] if:

$(|Y_k(i,j)-Y_{prec}(i,j)| \geq \delta Y Max)||(|U_k(i,j)-U_{prec}(i,j)| \geq \delta U Max)||(|V_k(i,j)-V_{prec}(i,j)| \geq \delta V Max)$ is true then ΔP(k, vprec(i,j)=1 (pixel(i,j) different), otherwise ΔP(k, prec) (i,j)=0 (pixel(i,j) identical). δYMax, δUMax and δMax are integer positive parameters making it possible to adjust the level of similarity between Pk(i, j) and Pprec(i,j).

δYMax∈[0, 220]
δUMax∈[0, 220]
δVMax∈[0, 220]

There is considered to be video freeze at the $k^{th}$ image between the images of indices ref and k, prec [0, NbI−2] and k∈ [1, NbI−1] if and only if ∀i∈ [0, Vheight] and ∀j∈ [0, Vwidth], the following equation is satisfied:

$$\sum_{i=0}^{Vheight} \sum_{j=0}^{Vwidth} \Delta P_{(k,prec)}(i, j) \leq \Delta P_{Max}$$

ΔPMax is a positive integer which represents the number of accepted max differences when two consecutive images of a video are considered to be identical.

There is therefore freeze on a sequence of X consecutive images of a video if and only if: ref∈ [0, NbI−X−1] and ∀k∈ [prec+1, ref+X−2]

$$\sum_{i=0}^{Vheight} \sum_{j=0}^{Vwidth} \Delta P_{(k,prec)}(i, j) \leq \Delta P_{Max} \quad (1)$$

A degree of similarity between the image of index k and the image of index prec is now defined. It is denoted τ(k, ref) and is obtained in the following manner:

$$\tau_{(k,ref)} = \frac{\sum_{i=0}^{Vheight} \sum_{j=0}^{Vwidth} \Delta P_{(k,prec)}(i, j)}{Vheight \times Vwidth} \quad (2)$$

Calculation of duration: subsequent to the detection of an image freeze Dvj, a calculation of the duration dj (in ms) of this freeze is carried out.

The duration of an image freeze is calculated in the following manner. For a sequence of x consecutive images of the sample $ev_i$ of the video component, we consider the previous image precf such that prec [0, NbI−x−1], images k, such that k∈[prec+1, prec+x], X the number of images of the freeze sequence and FPS the video display frequency. The duration of the image freeze corresponds to:

$$t_{freeze} = \frac{X}{FPS} \quad (3)$$

The results of this detection are obtained in the course of a step $E'_1$.

6.4.2 Perceptual Thresholding

In an advantageous manner, in the course of a step $E'_{1,2}$, the duration of the detected image freeze can be compared with a first perceptual threshold $\tau_{p1}$, typically of the order of 40 ms and rejected according to the following decision criterion:

If the duration of the freeze $t_{freeze}$ is greater than 40 ms then the freeze is considered to be potentially perceivable. If this condition is not satisfied the break in fluidity is then not taken into account.

An exemplary procedure for detecting a defect of audio freeze type will now be described in greater detail.

6.4.3 Classification of the Defects of Image Freeze Type

In the course of a step $E'_2$, a freeze type defect class is assigned to each defect detected, at least as a function of its duration, from among a group of classes comprising the following defects:

Micro freeze;
Postproduction effect;
Conventional freeze;
Macro freeze.

Classes of image freezes liable to be detected in a sample of an audio component are considered, by way of illustration, in conjunction with FIG. 7. They are positioned on the time axis as a function of their typical duration. In an order of increasing duration, we find the micro freeze, the postproduction effect, the conventional image freeze and the macro freeze.

In the context of the invention, they are defined as follows:
The Micro Freeze:

In conjunction with FIG. 9, a micro freeze of duration tfreeze is considered to be pseudo periodic with period Tµ.

There is micro freeze of duration freeze if and only if:
 a. There is no audio mute in the audio component or components associated with the video component (this is detected using the audio signal) for the duration $T_{freeze}$;
 b. $t_{gel} \in [t_{min\mu}, t_{max\mu}]$ and $t_{gel} \leq \sigma^* T_\mu$ σ is a real lying in the interval [0, 1], it represents the cyclic ratio of the pseudo period of a freeze below which the freeze is considered to be a micro freeze.

Tµ is the pseudo period of the micro freeze or the duration between two freeze starts.

tfreeze represents the duration of the video freeze as defined above, tminµ represents the minimum duration of the micro freeze (~76 ms), tmaxµ represents the maximum duration of the micro freeze (~350 ms).

With the invention, when a micro freeze is identified in $E'_2$ with the aid of the above definition, an analysis of the audio component is triggered, so as to verify that there is no associated audio loss.

Postproduction Effect

A video freeze of duration $t_{freeze}$ is considered to be a postproduction effect of "interpub" type and therefore not to be annoying by the observer, if and only if:
 c. A sound loss is associated with the image freeze and the duration of the sound loss satisfies the following relation: $T_{mute} \geq \alpha^* t_{freeze}$
  $T_{Mute}$ is the mute duration detected, a is a percentage generally greater than or equal to 80% (it makes it possible to take into account the audio/video shift), $t_{freeze} \in [T_{MinFF}, T_{MaxFF}]$, $T_{MinFF}$~200 ms and $T_{MaxFF}$~1 s;
 d. τmean<$\tau_{MaxIP}$, the mean degree of similarity between the various frozen images does not exceed the threshold $\tau_{MaxIP}$.

An exemplary image freeze exhibiting degrees of video similarity that are considered to be representative of a postproduction effect is presented in conjunction with FIG. 10.

τmean is the arithmetic mean of the degrees of similarity of the images of the analyzed freeze.

It is understood that in order for the "postproduction effect" class to be assigned to an image freeze, several conditions must all hold:
 Conditions on the defect of image freeze type itself (degree of similarity less than a threshold)
 The conjunction of an audio defect of sound loss type and a condition relating to the duration of the sound loss with respect to the duration of the image freeze.

The Conventional Image Freeze

There is considered to be actual image freeze of a duration tpp if and only if:
 a. This freeze is not a "postproduction effect";
 b. The audio analysis has led to the detection of an associated sound loss whose duration satisfies the relation $T_{mute} \geq \alpha^* t_{freeze}$. Where $T_{Mute}$ is the duration of the mute detected, α is a percentage generally greater than or equal to 80% (it makes it possible to take into account the audio/video shift);
 c. The duration of the freeze tpp∈[tminF, tminMF], where tminF represents the minimum duration of a freeze and tminMF represents the maximum duration of a defect of freeze type.

The Macro Freeze

An image freeze will be directly considered to be perceivable thereto only if the freeze time exceeds the duration $t_{minMF}$. In this typical case, one is dealing with a macro freeze and only the video component is considered in taking a decision. There is therefore no recourse to an analysis of the audio component.

It follows from this that at the level of step $E'_2$, the identification of a class of defect of image freeze type from among the predetermined plurality of classes is done at least on the basis of the calculated duration and optionally as a function of other measurements.

For example for the micro freeze, it relies on the measurement of a pseudo period of the detected freeze and the fact that the calculated duration of the freeze is much less than this pseudo period (cyclic ratio of the defect small).

As regards a defect of postproduction effect type, it relies on a measurement of degree of similarity which must remain less than a predetermined threshold (the images are not always exactly identical to one another).

The conventional freeze is identified with the aid of its duration which must be greater than a predetermined threshold.

The macro freeze is likewise identified with the aid of its duration which must be greater than a predetermined threshold.

6.4.4 Audio Detection

In the course of a step $E'_3$, a detection result for audio defects is obtained. According to this embodiment, an audio defect of sound loss type is detected when the audio signal undergoes an energy weakening with an energy level of the audio signal below a certain energy threshold over a given time period. An energy level and a duration is therefore associated with each defect detected.

An exemplary energy profile of an audio signal exhibiting an audio freeze or sound loss ("mute") is considered in conjunction with FIG. 8.

In this example, a procedure for detecting sound loss based on a two-step approach is considered. The first step consists in measuring an energy weakening of the audio signal over time. The second step consists in verifying that for the instants at which an energy weakening has been measured, the energy of the audio signal does not exceed a certain energy threshold.

Consequently, it is considered that a sound loss is manifest when the energy weakening is sufficient to maintain the energy of the audio signal below a certain energy threshold over a given time period.

The measurement is employed on the whole set of audio channels of a chain to be analyzed.

The first step amounts to searching for whether a falling edge exists.

The falling edge at the instant n is taken into account if and only if $E_n \leq \delta$ and $E_{n-2} > \delta'$, with En energy of the audio signal at the instant n, δ a max energy threshold and δ' a min energy threshold.

The duration of the sound loss is thereafter calculated in the following manner:

It is considered that the signal exhibits a sound loss for a duration $t_{PS}$ if and only if this state begins with a mute falling edge and that the energy level remains less than δ for the duration of the Mute state.

$$t_{PS} = N_{Smp} \times \frac{1}{F_{Smp}} \quad (4)$$

$N_{Smp}$ corresponds to the number of samples complying with the above conditions.

$F_{Smp}$ corresponds to the audio signal sampling frequency.

The results of this audio detection will be taken into consideration in the course of a decision step $E'_4$, as a function of the defect class considered.

6.4.5 Decisional Module

The decision step $E'_4$ will now be described in greater detail for this particular embodiment. On completion of the steps of detecting at least one image freeze on a sample ei and of analyzing the audio component, this step $E'_4$ ensures the production of the results over an analysis time window NbI corresponding to the sample ei.

This entails firstly, for each defect Dvj identified, confirming or denying the class which has been assigned to it.

According to the class of the examined defect, such a confirmation sub-step $E'_{41}$ has recourse to the results of the detection of audio defects:

For a micro freeze, the absence of sound loss in the sample makes it possible to confirm that the defect Dvj is a micro freeze;

For a defect Dvj identified as a production effect, the class will be confirmed if a sound loss has been identified and if it has a duration which satisfies the condition set forth above (slightly lower);

For a defect of conventional freeze type, the class is confirmed if a sound loss has been identified and if it has a duration which satisfies the condition set forth above (slightly lower);

For a defect of macro freeze type, the class has been confirmed right from step $E'2$ and the result of the audio analysis is not utilized.

Thereafter, in the course of another sub-step $E'4,2$, the decisional module then determines for each sample ei of an audiovisual stream whether or not the defects confirmed by $E'4,1$ are annoying to the user. For each confirmed image defect, its class is firstly considered.

If it is a postproduction effect, it is rejected, since it is considered not to be annoying to the user. Otherwise, for the other classes:

The group of $M_{Clk}$ defects belonging to one and the same class Clk is considered and an aggregate $T_{aggregate}$ of the durations of the defects of this group is computed and is compared with a second perceptual threshold $\tau_{p2}$.

$$T_{aggregate} = \sum_{m=0}^{M_{Clk}} dv_m \le S_2$$

Where $M_{Clk}$ is the number of confirmed defects for the class $Cl_k$.

It is considered that below this threshold, whose value is of the order of 500 ms, the defects of this defect class are not annoying to the user.

All the defects of one and the same class Clk can therefore be rejected if their aggregated duration is not sufficient according to this perceptual criterion.

The decisional module according to the invention therefore provides as output a reduced number of image defects with respect to the number of candidates arising from step $E'1$, corresponding to those which have successfully passed the tests of sub-steps $E'41$ and $E'42$.

6.5 Evaluation of Defects of Blockiness Effect Type

The field of application of the invention is not limited to the evaluation of image defects of image freeze type, but relates to any other type of image defect introduced by the transmission of an audiovisual stream over a network. Indeed, an alteration of the multiplexed stream has an impact on the audio and video components at the same temporal instants.

According to another embodiment of the invention, image defects of blockiness effect type are considered. In a similar manner to the detection of image freezes, the detection of blockiness effects can be associated with the results of an evaluation of sound losses on the audio component associated with the video component.

Indeed, in the same manner as for the defects of image freeze type, the effects of blockiness type can exhibit different characteristics: notably, the durations of blockiness effect may vary between 20 ms to a few seconds. Moreover, a blockiness effect may be limited to a small zone of the image or conversely may involve the entire image.

In the case where the blockiness effects are manifest, detection does not pose any particular difficulty and does not require recourse to the method according to the invention.

On the other hand, when the spatial zones involved in the blockiness effect detected are small and/or when the duration associated with this blockiness effect is too low, recourse to the detection of sound losses on the sample involved may make it possible to confirm or to deny the presence of annoying blockiness effects in the sample.

It is understood that in a manner similar to that presented in respect of the image defects of freeze type, it is possible to establish predetermined classes of blockiness effects, which are differentiated at least by their duration and/or their spatial extent. Thus, the method according to the invention can be applied to defects of blockiness effect type.

According to a variant, a previous detection of defects of freeze type over a common analysis period can be validly utilized by the method according to the invention to confirm or deny the presence of defects of annoying blockiness effect type in an audiovisual stream.

The invention which has just been presented can be applied to any audiovisual signal at any juncture of its distribution chain. It makes it possible to evaluate in a more effective manner the quality defects engendered by its transmission or step of transcoding, as a function of perceptual criteria.

The invention claimed is:

1. A method for evaluating at least one defect of quality of a signal carrying data intended to be played back to a recipient, said signal comprising at least one video component and one audio component, said method being comprising the following steps, implemented on at least one sample of said signal:
    detection of at least one defect in the video component of the sample and calculation of a duration associated with said at least one defect;
    assignment of a defect class to said at least one defect detected at least as a function of its associated duration;
    according to the assigned defect class, obtaining of a result of a search for at least one defect in the audio component at the instants corresponding to the sample;

decision to confirm the detection of a defect of quality in the sequence at least as a function of the result of the search for a defect in the audio component.

2. The method for evaluating at least one defect of quality as claimed in claim 1, wherein the detection step comprises, subsequent to the detection of a defect in the video component, a sub-step of rejecting the detected defect if its associated duration is less than a first predetermined perceptual detection threshold.

3. The method for evaluating at least one defect of quality as claimed in claim 1, wherein the decision step comprises a sub-step of aggregating the durations associated with the image defects detected of like class, a sub-step of rejecting said defects of like class, if their aggregated duration is less than a second predetermined perceptual detection threshold.

4. The method for evaluating at least one defect of quality as claimed in claim 1, wherein the detection step is intended to detect defects of image freeze type, in that it comprises a step of calculating a value of similarity between images of the sample and a step of comparing the calculated similarity value with a predetermined threshold.

5. The method for evaluating at least one defect of quality as claimed in claim 4, wherein the class of image freeze detected belongs to a group consisting of
   a micro freeze;
   a conventional freeze;
   a postproduction effect;
   a macro freeze.

6. The method for evaluating at least one defect of quality as claimed in claim 5, wherein the step of obtaining a result of a search for a defect in the audio component is implemented for a defect of image freeze type whose class belongs to the group consisting of:
   micro freeze;
   conventional freeze:
   postproduction effect.

7. The method for detecting a degradation in quality as claimed in claim 5, wherein the step of obtaining a result of a search for a defect in the audio component is not implemented for a defect of image freeze type whose class belongs to the group consisting of:
   macro freeze.

8. The method for evaluating at least one defect of quality as claimed in claim 1, wherein the detection step is intended to detect defects of blockiness type, an comprises a step of calculating a value of degree of blockiness between images of the sample and a step of comparing the calculated value with a predetermined threshold.

9. A device for evaluating at least one defect of quality of a signal carrying data intended to be played back to a recipient, said signal comprising at least one video component and one audio component, said device comprises:
   a memory storing computer-readable instructions; and
   a processor configured by the instructions to implement the following steps on at least one sample of a sequence of images of said signal:
      detecting at least one defect in the video component of the image sequence and calculation of a duration associated with said at least one defect;
      assigning a defect class to said at least one defect detected at least as a function of its associated duration;
      depending on the assigned defect class, obtaining of a result of a search for at least one defect in the audio component at the instants corresponding to the sample; and
      making a decision to confirm the detection of said at least one image defect in the sample at least as a function of the result of the search for a defect in the audio component obtained.

10. The device of claim 9, wherein the device is a receiver of the video signal.

11. A system for distributing an audiovisual signal to at least one user terminal, said system comprising:
   a plurality of node appliances connected to at least one telecommunications network, the node appliances being configured to receive said signal and to retransmit it to a neighboring node appliance;
   a receiver of the video signal;
   wherein at least one appliance from among the plurality of node appliances and the receiver appliance comprises a device for evaluating a defect of quality of the signal carrying data intended to be played back to a recipient by the receiver, said signal comprising at least one video component and one audio component, said device comprises:
      a memory storing computer-readable instructions; and
      a processor configured by the instructions to implement the following steps on at least one sample of a sequence of images of said signal:
         detecting at least one defect in the video component of the image sequence and calculation of a duration associated with said at least one defect;
         assigning a defect class to said at least one defect detected at least as a function of its associated duration;
         depending on the assigned defect class, obtaining of a result of a search for at least one defect in the audio component at the instants corresponding to the sample; and
         making a decision to confirm the detection of said at least one image defect in the sample at least as a function of the result of the search for a defect in the audio component obtained.

12. A non-transitory recording medium readable by a processor on which is recorded a program comprising instructions for execution of a method for evaluating at least one defect of quality of a signal carrying data intended to be played back to a recipient, said signal comprising at least one video component and one audio component, said processor being configured by the instructions to perform the following steps, implemented on at least one sample of said signal:
   detection of at least one defect in the video component of the sample and calculation of a duration associated with said at least one defect;
   assignment of a defect class to said at least one defect detected at least as a function of its associated duration;
   according to the assigned defect class, obtaining of a result of a search for at least one defect in the audio component at the instants corresponding to the sample;
   decision to confirm the detection of a defect of quality in the sequence at least as a function of the result of the search for a defect in the audio component.

* * * * *